(12) United States Patent
Cheng et al.

(10) Patent No.: US 10,809,768 B2
(45) Date of Patent: Oct. 20, 2020

(54) INTELLIGENT PLATFORM

(75) Inventors: Shang-Che Cheng, Saratoga, CA (US); Wei-Han Wu, New Taipei (TW); Chia-Ming Lin, Taipei (TW)

(73) Assignee: ICE COMPUTER, INC., Saratoga, CA (US)

( * ) Notice: Subject to any disclaimer, the term of this patent is extended or adjusted under 35 U.S.C. 154(b) by 1501 days.

(21) Appl. No.: 13/168,666

(22) Filed: Jun. 24, 2011

(65) Prior Publication Data
US 2012/0011293 A1 Jan. 12, 2012

Related U.S. Application Data

(60) Provisional application No. 61/363,240, filed on Jul. 10, 2010.

(51) Int. Cl.
*G06F 13/00* (2006.01)
*G06F 1/16* (2006.01)

(52) U.S. Cl.
CPC .......... *G06F 1/1656* (2013.01); *G06F 1/1632* (2013.01)

(58) Field of Classification Search
CPC .............................. G06F 1/1632; G06F 1/1656
USPC .................................. 710/300, 303, 104, 105
See application file for complete search history.

(56) References Cited

U.S. PATENT DOCUMENTS 6,489,932 B1 * 12/2002 Chitturi .................. G06F 1/1601
345/173
6,538,880 B1 * 3/2003 Kamijo et al. ............. 361/679.4
6,636,918 B1 10/2003 Aguilar et al.
6,822,635 B2 11/2004 Shahoian et al.

(Continued)

FOREIGN PATENT DOCUMENTS

CN 201387605 Y 1/2010
GB 2435958 A1 9/2007

(Continued)

OTHER PUBLICATIONS

Japanese Notice of Reasons for Rejection, dated Dec. 25, 2013, with English translation provided by Ryuka, 4 pgs.

(Continued)

*Primary Examiner* — Idriss N Alrobaye
*Assistant Examiner* — Brooke J Taylor
(74) *Attorney, Agent, or Firm* — Edward C. Kwok; VLP Law Group, LLP

(57) ABSTRACT

An intelligent platform integrates with an intelligent portable device or intelligent core to provide a dynamic computer that may serve as any of: a pad, a tablet computing device, a netbook computer, and a notebook computer. The operations of the integrated device are determined by the connected intelligent core's CPU architecture and its installed operating system. The intelligent platform includes a housing and a core slot located behind a display for accommodating the intelligent core. A core connector is provided on an inner wall of the core slot for interconnecting with a compatible connector of the inserted intelligent core. A control unit continually communicates with the intelligent core through signals carried by the connector, refreshes image received from the intelligent core on its touch-sensitive display, and sends touch-input commands from the touchable panel of the touch-sensitive display to the intelligent core. The battery on intelligent platform provides backup power to the intelligent core.

19 Claims, 10 Drawing Sheets

(56) References Cited

U.S. PATENT DOCUMENTS

| | | | |
|---|---|---|---|
| 7,120,462 B2 | 10/2006 | Kumar | |
| 7,136,282 B1 | 11/2006 | Rebeske | |
| 7,266,774 B2 * | 9/2007 | Jones | 715/733 |
| 7,543,099 B2 * | 6/2009 | Han | 710/303 |
| 7,624,210 B2 * | 11/2009 | Izutsu | 710/62 |
| 7,831,276 B2 | 11/2010 | Kumar | |
| 8,035,963 B2 | 10/2011 | Ladouceur et al. | |
| 8,041,300 B2 * | 10/2011 | Dorogusker | H01R 31/065 455/41.1 |
| 8,072,392 B2 * | 12/2011 | Lection | 345/1.1 |
| 8,081,170 B2 | 12/2011 | Ko et al. | |
| 8,390,583 B2 | 3/2013 | Forutanpour et al. | |
| 8,432,362 B2 | 4/2013 | Cheng et al. | |
| 8,506,085 B2 | 8/2013 | Azor et al. | |
| 8,624,841 B2 | 1/2014 | Kim et al. | |
| 8,850,610 B2 | 9/2014 | Johnson | |
| 9,083,812 B2 | 7/2015 | Ryan | |
| 2002/0090919 A1 | 7/2002 | Hofman | |
| 2002/0103951 A1 * | 8/2002 | Huber et al. | 710/72 |
| 2003/0095105 A1 | 5/2003 | Vaananen | |
| 2004/0019724 A1 * | 1/2004 | Singleton et al. | 710/303 |
| 2004/0104942 A1 | 6/2004 | Weigel | |
| 2004/0123604 A1 | 7/2004 | Pokharna | |
| 2004/0268005 A1 * | 12/2004 | Dickie | G06F 1/1616 710/303 |
| 2005/0013103 A1 | 1/2005 | Chandley | |
| 2005/0162336 A1 | 7/2005 | McClintock et al. | |
| 2006/0192689 A1 | 8/2006 | Wang et al. | |
| 2006/0236014 A1 * | 10/2006 | Yin et al. | 710/303 |
| 2008/0002355 A1 | 1/2008 | Carnevali | |
| 2008/0062625 A1 | 3/2008 | Batio | |
| 2008/0123285 A1 * | 5/2008 | Fadell et al. | 361/686 |
| 2008/0167014 A1 | 7/2008 | Novick et al. | |
| 2008/0304688 A1 * | 12/2008 | Kumar | 381/370 |
| 2009/0044259 A1 | 2/2009 | Bookman et al. | |
| 2009/0225035 A1 | 9/2009 | Baik | |
| 2009/0271556 A1 | 10/2009 | Rutherford, III et al. | |
| 2009/0295750 A1 | 12/2009 | Yamazaki et al. | |
| 2009/0296331 A1 | 12/2009 | Choy | |
| 2009/0311903 A1 | 12/2009 | Bychkov | |
| 2010/0007668 A1 | 1/2010 | Casparian et al. | |
| 2010/0085382 A1 | 4/2010 | Lundqvist et al. | |
| 2010/0087093 A1 | 4/2010 | Yu | |
| 2010/0095041 A1 | 4/2010 | Bailey | |
| 2010/0109999 A1 | 5/2010 | Qui | |
| 2010/0137028 A1 | 6/2010 | Farris et al. | |
| 2010/0246119 A1 * | 9/2010 | Collopy | G06F 1/1616 361/679.55 |
| 2010/0321275 A1 | 12/2010 | Hinckley et al. | |
| 2011/0002096 A1 | 1/2011 | Thorson | |
| 2011/0216007 A1 | 9/2011 | Cheng et al. | |
| 2011/0228463 A1 | 9/2011 | Matagne | |
| 2012/0084721 A1 | 4/2012 | Gimpl et al. | |
| 2012/0126745 A1 | 5/2012 | Partovi et al. | |
| 2012/0127284 A1 | 5/2012 | Bar-Zeev et al. | |
| 2012/0210034 A1 * | 8/2012 | Ko | 710/303 |
| 2012/0268399 A1 | 10/2012 | Cheng et al. | |
| 2012/0324562 A1 | 12/2012 | Bansal et al. | |

FOREIGN PATENT DOCUMENTS

| | | |
|---|---|---|
| JP | 08242275 | 9/1996 |
| JP | 964953 A | 3/1997 |
| JP | 2008167213 A | 7/2008 |
| JP | 2010523008 A | 7/2010 |
| WO | 2001/098870 A2 | 12/2001 |
| WO | 2011/035137 A1 | 3/2011 |
| WO | 2012009151 A1 | 1/2012 |

OTHER PUBLICATIONS

PCT International Search Report and the Written Opinion dated Oct. 27, 2011, in related International Application No. PCT/US2011/042016.

PCT International Search Report and Written Opinion for PCT/US12/33752; dated Jul. 13, 2012, 6 pages.

Final Notice of Reasons for Rejection for Japanese Patent Application No. 2013-518533, dated Aug. 26, 2014, 1 pg.

PCT International Search Report and Written Opinion for International No. PCT/US2015/030182, dated Aug. 5, 2015, 11 pages.

First Office Action for Chinese Patent Application 201180043616.1, dated May 21, 2015, 8 pages.

European Examination Report, EP11807268.5, dated Jul. 30, 2018.

Second Office Action for Chinese Patent Application 201180043616.1, dated Jan. 29, 2016, 7 pages.

Office Action for Chinese Patent Application 201180043616.1, dated Aug. 3, 2016, 2 pages (including English translation).

* cited by examiner

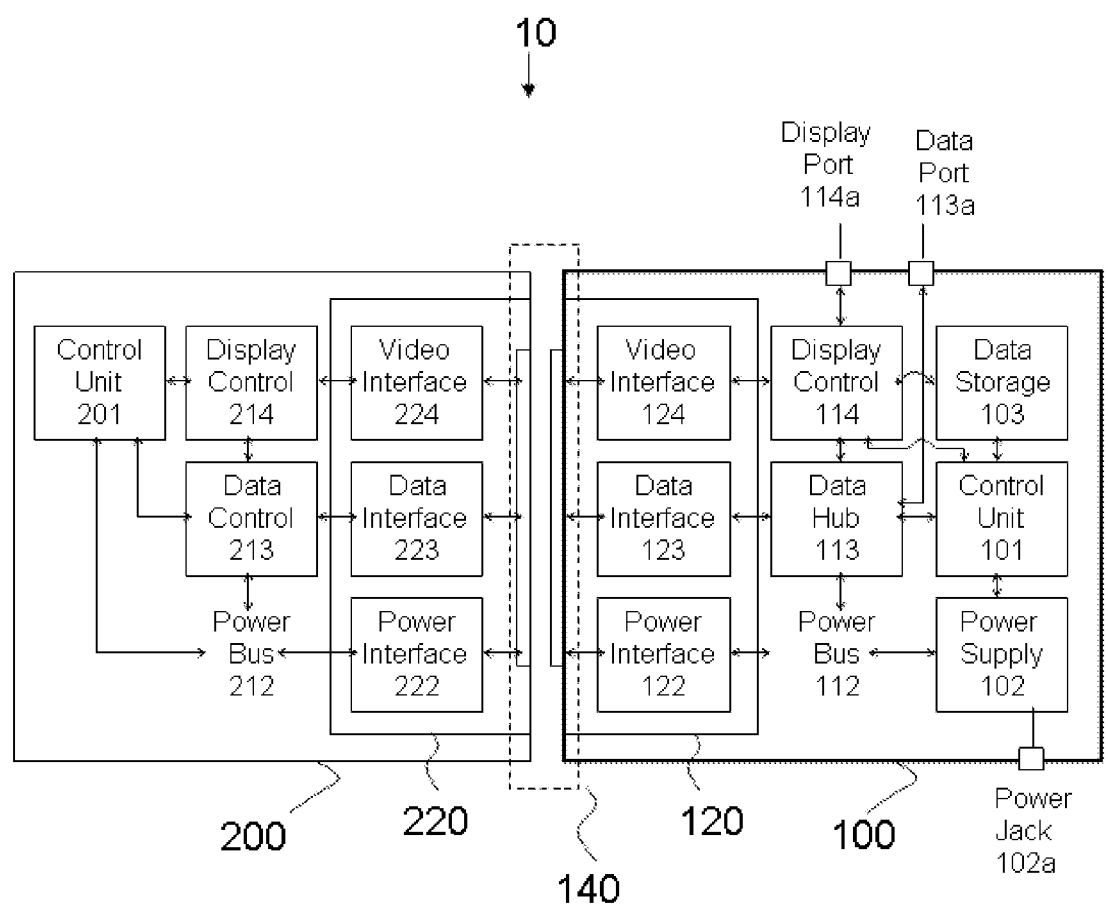

INTELLIGENT PLATFORM

CROSS REFERENCE TO RELATED APPLICATIONS

The present invention is related to and claims priority of U.S. provisional patent application ("Application"), Ser. No. 61/363,240, entitled "XPAD TABLET," filed on Jul. 10, 2010. The Application is hereby incorporated by reference in its entirety.

BACKGROUND OF THE INVENTION

1. Field of the Invention

The present invention relates to a dynamic computer and, more particularly, to a novel computing platform ("intelligent platform") that accommodates a computing core device ("intelligent core"), thereby providing the intelligent core computational resources when connected. The intelligent platform dynamically becomes a pad- or tablet-type computing device, a netbook-type computer, or a notebook computer, depending on the connected computing core's central processing unit (CPU) architecture and loaded operating system.

2. Discussion of the Related Art

A typical modern pocket-sized cellular telephone has a small display (e.g., less than five inches across), a limited battery life, and a tiny keyboard. As a result, for a user who has difficulty viewing the display, entering data, or who requires a longer talk time between charging, such a cellular telephone is unsatisfactory in these regards. Quite often, even a user who does not have any of these requirements may desire a bigger display, a larger keyboard, or a longer battery life between charging.

In January, 2010, Apple Computer, Inc. introduced a tablet computer called the "iPad," which is basically a version of their intelligent cellular telephone (i.e., the iPhone) with a larger display, a larger keyboard, and a longer battery life between charging. Alternatively, some intelligent cellular telephone manufacturers have provided various docking stations to allow their users to indirectly connect their cellular telephones to a larger external monitor and to be able to use a larger keyboard. One example is the commercially available iPhone Screen Enlarger, which allows an iPhone user to place the iPhone next to a larger display screen; the user can then manipulate objects in the display, while viewing the larger display and using the iPhone touch-sensitive screen to provide touch input.

On one hand, the iPad approach provides an expensive stand-alone tablet device which does not allow any intelligent cellular telephone (including the iPhone) to connect to it or share its resources or components. Most of the data duplication or synchronization operations between the tablet device and a cellular telephone must be carried out using a third computer. On the other hand, the docking station approach does not 'tightly' integrate the intelligent cellular telephone with the larger display or the larger keyboard. Further, the external displays and keyboards are typically not portable.

SUMMARY

The present invention offers an intelligent core which provides a cost-effective, intelligent core-based tablet computer. In one embodiment, an intelligent platform provides for the intelligent core to be inserted into its housing to tightly integrate with a large display and to take advantage of the intelligent platform's backup power. The intelligent platform is preferably portable, sharable, lightweight, and is driven by the inserted intelligent core. The data of the intelligent core remains on the intelligent core, on network servers, on cloud servers, or is stored on a peripherals residing in the intelligent platform that can be directly accessed by the intelligent core. Under such an arrangement, therefore is no need for data synchronization between the intelligent core and the intelligent platform.

According to one embodiment of the present invention, an intelligent core-based tablet computer is controlled by its inserted intelligent core. In one embodiment, an intelligent platform provides a core slot in its housing that can accommodate through a matching connector any of a number of intelligent cores. When an intelligent core is inserted, the resulting device is a tablet computer, in which the peripherals of the intelligent platform are shared with the inserted intelligent core. One such peripheral is a larger touch-sensitive display panel that can be used to input and view data of the inserted intelligent core without requiring the user to operate the tablet computer through the touch-sensitive screen of the intelligent core directly. The tablet computer can also provide a backup power source to the inserted intelligent core. The tablet computer can also provide a larger virtual keyboard to a user of the inserted intelligent core.

According to one embodiment of the present invention a cost-effective tablet computer is achieved by having the tablet computer take advantage of components and capabilities that are available from the intelligent core.

According to one embodiment of the present invention, the intelligent platform comprises a housing which includes a core slot for inserting an intelligent core, a touch-sensitive graphical display, a battery, a control unit, a core connector and an external connector. The core slot is preferably located behind the touch-sensitive graphical display, such that the inserted intelligent core would not block a user's clear view of the large touch-sensitive display. In one embodiment, a core connector is located at a designated position inside the core slot so as to interconnect or mate with a compatible connector on the inserted intelligent core. The core connector on the intelligent platform is electrically connected to the control unit, so as to allow the control unit to directly communicate with the inserted intelligent core. In one direction, the control unit may receive image data from the intelligent core to displays it on the touch-sensitive display. In the opposite direction, data and commands received over the touch-sensitive display entered by user are sent to the intelligent core. The battery may act as a power source for both the intelligent platform and the inserted intelligent core. The external connector provides an interface between the control unit in the intelligent platform and an external computer, dock-station, one or more peripherals, or a power source.

The intelligent core typically resides in handset-size housing and includes a swap-able circuit board on which a control unit is provided. The control unit typically has a CPU, a graphics processing unit (GPU) and on-board memories, and thus typically can run applications and can play digital videos. One example of such an intelligent core is a cellular telephone, such as any cellular telephone that is often referred to as a "smart phone."

The present invention is better understood upon consideration of the detailed description below in conjunction with the accompanying drawings.

BRIEF DESCRIPTION OF THE DRAWINGS

FIG. 6 is a block diagram showing one implementation in which intelligent platform 10 is connected to intelligent core 200 over a PDMI connector.

FIG. 8a is a perspective view of intelligent platform housing 100 with a push-push drawer-type core slot;

FIG. 8b is a perspective view of intelligent platform housing 100 with core slot 140 under a slide-able touch-sensitive display;

FIG. 8c is a perspective view of intelligent platform housing 100 with core slot 140 under a pop-up door, in the manner of a cassette tape door;

FIG. 8d is a perspective view of intelligent platform housing 100 with core slot 140 providing on an edge of intelligent platform housing 100;

FIG. 8e is a rear view of small pop-out adaptor 300, which is implemented on the back of intelligent platform housing 100 to hold intelligent core 200, when popped-out;

FIG. 8f is a rear view of intelligent platform housing 100 with small pop-out adaptor 300 holding an intelligent core 200, as illustrated in FIG. 8e;

FIG. 8g is the right perspective view of FIG. 8f;

FIG. 8h is a rear view of intelligent platform housing 100 with open core slot 140 at one edge of intelligent platform housing 100; and FIG. 8i is a rear view of intelligent platform 100 with open core slot 140 at one corner of intelligent platform housing 100.

For purposes of clarity and brevity, like elements and components bear the same designations and numbering throughout the FIGURES.

DETAILED DESCRIPTION OF THE PREFERRED EMBODIMENTS

Figure 1:
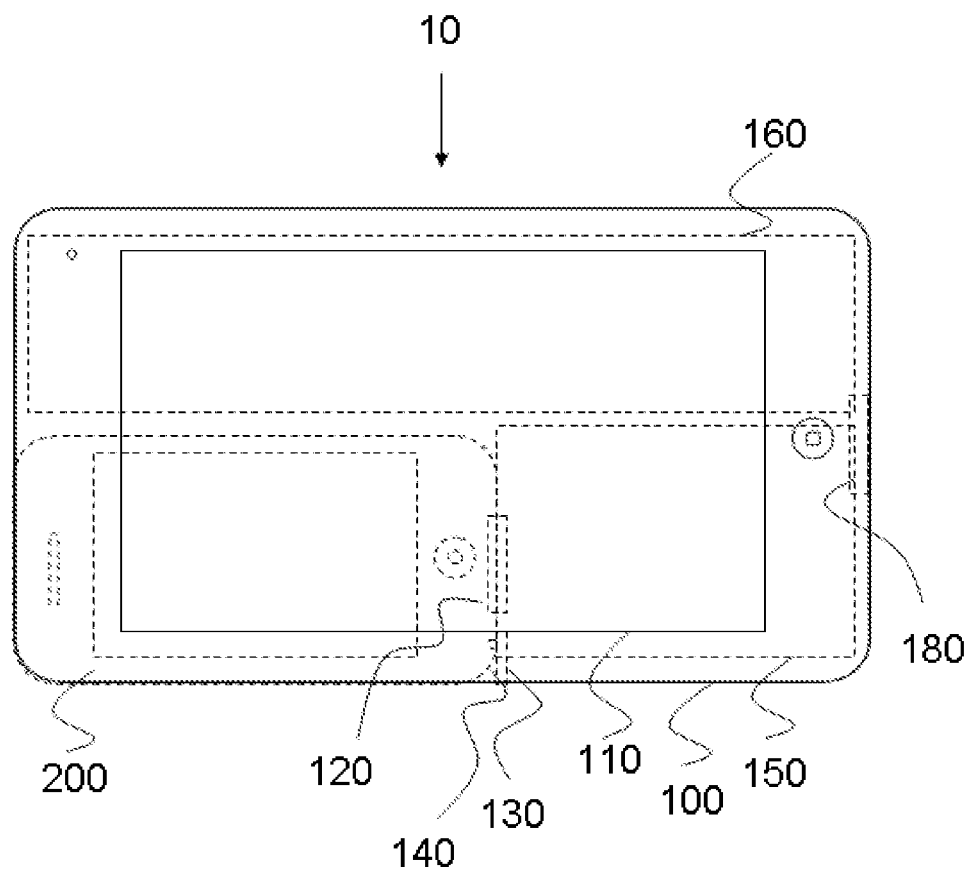
FIG. 1 is a front view of intelligent platform 10, in accordance with one embodiment of the present invention.

FIG. 1 is a front view of an intelligent platform 10 in accordance with one embodiment of the invention. As shown in FIG. 1, intelligent platform 10 is an intelligent core-based tablet computer accommodating an intelligent core, such as intelligent core 200 shown. In some embodiments, intelligent core 200 and intelligent platform 10 has a brain-body relationship (i.e., intelligent core 200, when connected to intelligent platform 10, controls the operation of intelligent platform 10).

Intelligent platform 10 includes touch-sensitive display 110 and battery 160, which may serve as a larger display and a backup power source for the intelligent core 200. In addition, intelligent platform 10 includes housing 100, core slot 140 (behind touch-sensitive display 110, as shown in FIG. 1; see, also, FIG. 2a), control unit 150, core connector 120 and external connector 180. As mentioned above, core slot 140 is located behind display 110 for accommodating intelligent core 200 without blocking a user's view of touch-sensitive display 110. Core connector 120 (e.g., a male connector) is provided on one inner wall of core slot 140 to interconnect with a compatible connector (e.g., a female connector) on inserted intelligent core 200. Core connector 120 is electrically connected to control unit 150, so that control unit 150 may communicate with intelligent core 200. Control unit 150 may include one or more of peripheral connector (e.g., a USB 3.0 hub, a USB 2.0 hub, an Intel Light Peak optical cable interface or another industry standard bus), and may be associated with a microprocessor system which runs an industry standard operating system (e.g., operating systems from Apple or Microsoft, Android, Blackberry OS, Palm OS, Unix, Linux etc.) or executes a collection of machine instructions that control the operations of the processor.

Control unit 150 may receive image data from intelligent core 200 and displays the image data on touch-sensitive display 110, and then sends to intelligent core 200 touch commands entered by the user on the touch panel of touch-sensitive display 110. Battery 160 is electrically connected to the control unit 150, and may act as power source for both intelligent platform 10 and inserted intelligent core 200. External connector 180 is electrically connected to control unit 150, and may be used as a bridge to an external computer, a docking station, a power source or one or more peripherals. In this manner of operation, intelligent platform 10 may be described as a "body" device, while intelligent core 200 may be described as a "brain" device.

Figure 2A:
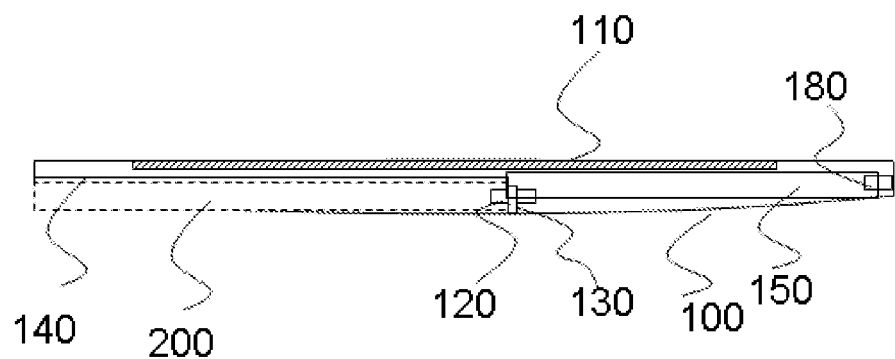
FIG. 2a shows core slot 140 of intelligent platform 10, viewed from the bottom end of intelligent platform 10.

FIG. 2a shows core slot 140 of intelligent platform 10, viewed from the bottom end of intelligent platform 10 (i.e., viewed from the opposite direction of arrow 10 of FIG. 1). Core connector 120 is located on the far inside wall of core slot 140. Core connector 120 is electrically connected to control unit 150, which is provided on a circuit board. Control unit 150 controls the flow of data between intelligent platform 10 and intelligent core 200 (connected at core connector 120) and between intelligent platform 10 and any external computer or device connected at external connector 180. Control unit 150 coordinates the activities of the other components within intelligent platform 10. Intelligent platform 10 has a set of built-in peripherals (such as a microphone, one or more speakers, a webcam, and a USB hub). Depending on the locations of a microphone and a speaker on intelligent core 200, optional sound pipe 130 may be provided to enhance voice quality by guiding the voice commands and sound outputs directly into and out of intelligent core 200. For example, if the microphone and the speaker on intelligent core 200 are located along an edge facing core connector 120 when intelligent core 200 is inserted into intelligent platform 10, sound pipe 130 may be provided along that edge to guide the sound from its speaker out of the closed area and from the exterior to its microphone. Alternatively, intelligent platform 10 may provide a microphone and one or more speakers that substitute the microphone or speakers of intelligent core 200. In some embodiments, the microphone may accept voice commands to intelligent core 200.

Figure 2B:
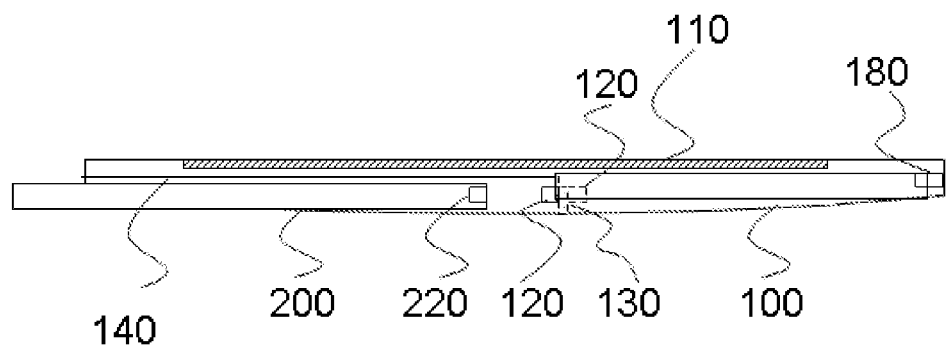
FIG. 2b shows core slot 140 of intelligent platform 10, with intelligent core 200 half inserted into the core slot, viewed from the bottom end of intelligent platform 10.

FIG. 2b shows core slot 140 with intelligent core 200 half-inserted into intelligent platform 10, viewed from the same direction as the view of FIG. 2a. Intelligent core 200 is inserted into the core slot 140, such that a platform connector 220 of intelligent core 200 is mechanically mated and electrically connected with core connector 120. In this configuration, control unit 150 communicates with intelligent core 200 to exchange resolution information and directs intelligent core 200 to send its images to intelligent platform 10's larger touch-sensitive display 110. At the same time, control unit 150 activates the touch panel of touch-sensitive display 110 to receive commands entered by the user, which are transmitted as touch input signals from the touch panel on touch-sensitive display 110. (Here, the term "command" includes any representation of data input for a touch panel, such as multi-point contacts and gestures). In addition, if mechanical buttons are provided on intelligent platform 10, input commands from the user may also be received from operations of these buttons. Control unit 150 sends the input signals or the received commands to intelligent core 200. Control unit 150 repeatedly refreshes the images on its touch-sensitive display 110 and communicates control and data signals, including the received commands, back and forth between it and intelligent core 200.

Core connector 120 may be any proprietary connector designed to match platform connector 220 of an intelligent core of a particular manufacturer or make. Alternatively, core connector 120 may be a generic connector to which adaptors for mating with different intelligent cores of different manufacturers or makes may be provided. In that case, the user may use the intelligent platform 10 with intelligent cores of many different manufacturers/makes. In each adaptor, a small circuit board including a protocol conversion circuit may be included to translate any of the different signal conventions to the signaling convention adopted by intelligent platform 10.

Figure 3:
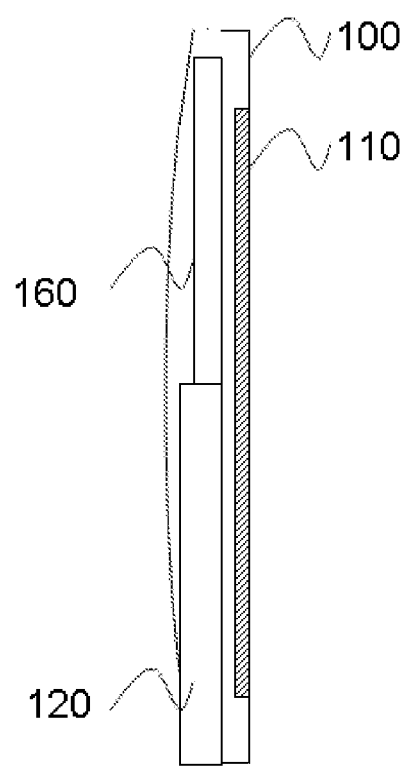
FIG. 3 is a side left view of intelligent platform 10, together with inserted intelligent core 200.

FIG. 3 shows intelligent platform 10 with inserted intelligent core 200, as viewed from the left side of intelligent platform 10 (i.e., in the opposite direction of external connector 180 of FIG. 1). As shown in FIG. 3, intelligent platform 10 has battery 160, which has a substantially greater storage capacity than the battery on intelligent core 200. Thus, battery 160 can act as a backup power source for intelligent core 200, especially when the user places intelligent platform 10 into a stand-by mode, in which touch-sensitive display 110 is turned off.

Figure 4:
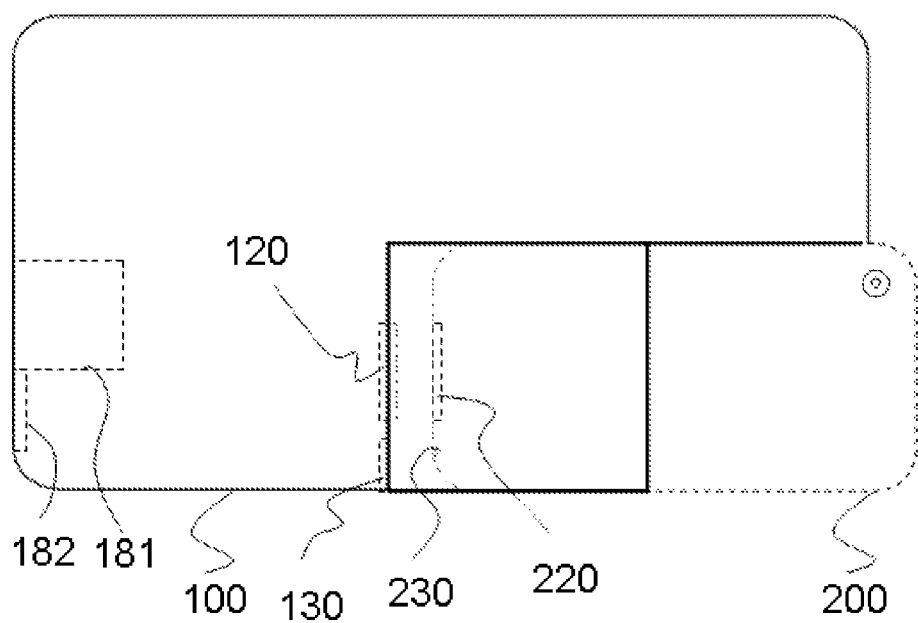
FIG. 4 is a rear view of intelligent platform 10 with half-inserted intelligent core 200.

FIG. 4 shows intelligent platform 10, showing half-inserted intelligent core 200, when viewed from the rear side of intelligent platform 10 (i.e., viewed in the direction opposite from the view direction of FIG. 1). As shown in FIG. 4, embedded SD memory reader 181, USB connector 182 and one or more other optional peripherals are also provided to allow intelligent core 200 the options of accesses to additional data storage and additional connectivity to other external devices.

Figure 5:
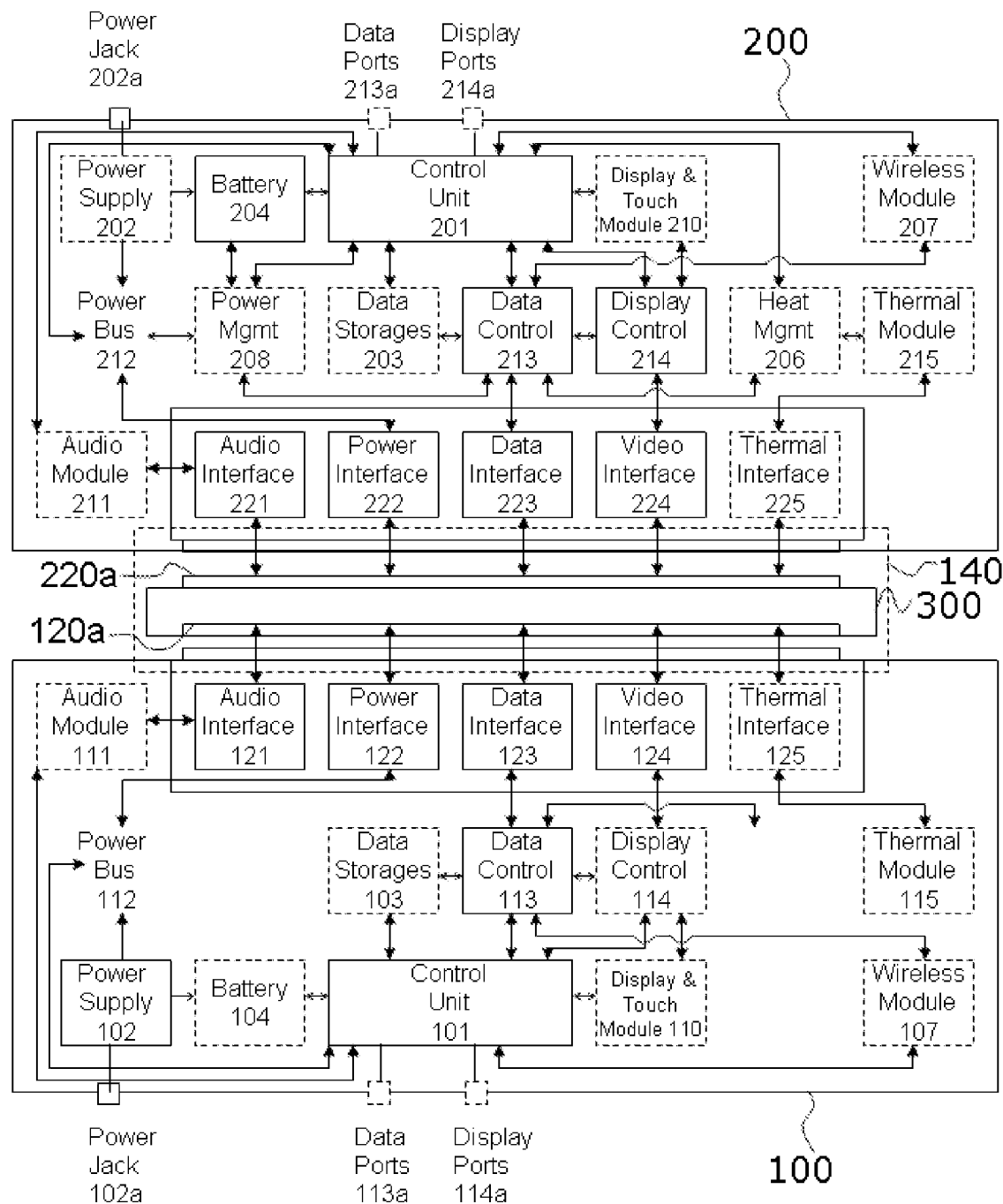
FIG. 5 is a block diagram showing intelligent platform 10 being connected to intelligent core 200 through adaptor 300 provided therebetween.

FIG. 5 is a block diagram showing intelligent platform 10 connected to intelligent core 200 through an optional adaptor 300 provided therebetween. Adaptor 300 enables a user to use intelligent platform 10 with one of a number of intelligent cores from many different manufacturers or suppliers. In one embodiment, adaptor 300 includes target proprietary core interface 220a. To use a different intelligent core, a corresponding adaptor, similar to adaptor 300, but including the proprietary core interface corresponding to this different intelligent core, is used. In one embodiment, intelligent core 200 is a smart phone, which has a control unit 201 that uses an ARM embedded microprocessor. The embedded microprocessor has embedded program memory for command execution. In addition, intelligent core 200 has (a) wireless module 207 for sending and receiving data, (b) power supply 202, which is connected to power jack 202a and power bus 212 to supply power to all components, (c) battery 204 under power management 208, (d) data storage system 203, (e) USB data control 213, which controls data ports 213a, (f) display control 214, which controls display ports 214a and display and touch panel module 210, and (g) audio module 211, which controls one or more microphones and one or more speakers. As shown in FIG. 5, the interfaces between intelligent platform 10 and intelligent core 200 are audio interface 221, power interface 222, data interface 223, and video interface 224 on intelligent core 200's side, and audio interface 121, power interface 122, data interface 123, and video interface 124 on intelligent platform 10's side.

According to another embodiment of the present invention, intelligent core 200 includes a microprocessor of a personal computer. In this case, intelligent core 200 includes a circuit board inside a swap-able box of the size of a handset. The circuit board includes control unit 201, which includes an X86 processor[1] and memories on-board to run applications. In this embodiment, additional heat management module 206, thermal module 215, and thermal interface 225 are provided. FIG. 5 also illustrates this embodiment, showing the additional elements in dotted lines. Thermal module 215 may include one or more heat pipes and one or more heat sinks connected to the CPU or GPU to dissipate heat generated from the processor. Heat management module 216 monitors the heating condition, and manages the heating condition at intelligent platform 10 through data interface 223 (e.g., to control turning on a cooling fan inside intelligent platform 10, which blows air in air ducts between thermal interface 225, on intelligent core 200's side, and thermal interface 125, on intelligent platform 10's side). FIG. 5 is therefore illustrative of at least two intelligent cores embodiments. In fact, under the principles of the present invention, different intelligent cores can be accommodated in an intelligent platform by customizing, for example, the external interfaces in the connector of core slot adaptor 300 of the intelligent platform 10.

[1] An X86 processor is a processor that runs an industry standard instruction set known as the X86 architecture.

As shown in FIG. 5, intelligent platform 10 includes control unit 101 that has a processing unit or processor. The processor is typically provided embedded program memory to execute commands, which coordinate operations in intelligent core 200 and control internal operations of intelligent platform 10. As shown in FIG. 5, intelligent platform 10 also includes (a) optional wireless module 107 for sending and receiving data, (b) power supply 102, which is connected to power jack 102a and power bus 112 for supplying power to all components, (c) battery 104, which provides back-up power to intelligent core 200, (d) data storage 103, (e) USB data control 113, which controls data ports 113a, (f) display control 114 for controlling display ports and its own display (if available), (g) touch panel module 110, and (h) audio module 111 for controlling microphones and speakers. As mentioned above, intelligent platform 10 connects with intelligent core 200 over audio interface 121, power interface 122, data interface 123, and video interface 124. In another embodiment, for example, where intelligent core 200 includes an X86 processor, additional thermal module 115 and thermal interface 125 are provided. Thermal module 115 includes a cooling fan which drives air through air duct in thermal interface 125 from intelligent platform 10 to remove heat from heat sink at thermal module 215 under control of heat management 206.

As shown in FIG. 5, optional core slot adaptor 300 includes a female connector at device interface 120a, provided for mechanically mating and electrically connecting with a universal generic male core connector 120 in intelligent platform 10. Optional core slot adaptor 300 also has a male connector at core interface 220a, provided for mechanically mating and electrically connecting female platform connector 220 (e.g., a proprietary connector designed to match the interface signals provided by an intelligent core 200 of a particular manufacturer or make, such as that described in FIG. 2b). Optional core slot adaptor 300 bridges and translates signals from platform connector 220 by one of a number of intelligent cores of different manufacturers or makes and signals from core connector 120. In one embodiment, core slot adaptor 300 includes a small circuit board with a protocol conversion circuit which translates different signal conventions to the signaling convention adopted in core connector 120 of intelligent platform 10. In the absence of core slot adaptor 300, intelligent core 200 may be inserted into core slot 140 directly, which allows proprietary "female" platform connector 220 of intelligent core 200 to be mechanically mated and electrically connected with core connector 120 (provided on the inner wall of core slot 140, which is provided a proprietary male connector) of intelligent platform 10.

In one embodiment, control unit 101 exchanges both audio/video (A/V) and non-A/V data between intelligent core 200 and intelligent platform 10. As shown in FIG. 5, both core connector 120 on intelligent platform 10 and platform connector 220 on intelligent core 200 are integrated interfaces that include both A/V data signals and non-A/V data signals. In one embodiment, both intelligent platform 10 and intelligent core 200 allow one device to control the other, when desired. In one embodiment, the interfaces use industry standard or pre-defined and matched multiple pin receptacle for electrical interfaces (e.g., DisplayPort, USB, Analog stereo line-out for legacy audio, HDMI, and power lines from intelligent core 200 and intelligent platform 10, etc.). During operation, control unit 101 communicates with the intelligent core 200 to obtain, for example, resolution information for the A/V signals. Control unit 101 receives image data from intelligent core 200 and displays the image data on touch-sensitive display 110 through A/V interfaces (e.g. HDMI, etc.). At the same time, control unit 101 activates the touch panel of touch-sensitive display 110 to receive commands entered by the user, which are transmitted as touch input signals from the touch panel on touch-sensitive display 110 to intelligent core 200 through data interfaces (e.g., USB, etc.). Control unit 101 repeat refreshes the image data sent from intelligent core 200 on its touch-sensitive display 110. Further, control unit 101 is coupled to one and more peripheral devices, such as memory, mass storage, image/video capture, human interface, wire/wireless networking, headphone, microphone, speaker, or other peripheral devices, to control and coordinate data and activities in intelligent platform 10 and to exchange data with intelligent core 200. In one embodiment, the components with broken lines as shown in FIG. 5 are optional. The optional components in intelligent core 200 can replace or complement its counterparts in connected intelligent platform 10. Likewise, the optional components in intelligent platform 10 can replace or complements its counterparts in connected external peripherals through data ports 113a or display ports 114a.

FIG. 6 is a block diagram showing intelligent platform 10 being connected to intelligent core 200 over a Portable Digital Media Interface (PDMI). The PDMI is an interconnection standard[2] for portable media players, which allows intelligent core 200 to access peripheral devices on intelligent platform 10. In one embodiment, intelligent platform 10 includes a control unit 101 that uses a simple processor for command execution and for peripheral coordination. As shown in FIG. 6, intelligent platform 10 includes (a) power supply 102, connected to power jack 102a for supplying power to all components, (b) USB data storage 103, (c) USB hub 113, which controls data ports 113a, and (d) display control 114 for controlling display ports 114a. In the male PDMI connector, intelligent platform 10 has power interface 122, USB data interface 123, and Display Port video interface 124. In FIG. 6, corresponding brain device intelligent core 200 may be based on the "PC" architecture, including a circuit board inside a box of a swap-able handset size. The circuit board includes control unit 201 that uses, for example, a low-end X86 processor and memories for running application programs. The low-end X86 processor (e.g., an Intel Atom processor) may not need heat management. In that case, intelligent core 200 includes (a) a power bus to distribute power to all components, (b) USB data control 213, and (c) display control 214. In the female PDMI connector, intelligent core 200 includes (a) power interface 222, (b) USB data interface 223, and (c) Display Port video interface 224. As soon as intelligent core 200 and intelligent platform 10 connect through the PDMI connectors in core slot 140, intelligent platform 10 supplies power to intelligent core 200. Intelligent core 200 then boots up its operating system, loads application programs and data from connected network servers, cloud servers, or data storage 103 through data control 213, data interface 223, data interface 123, and data hub 113. Intelligent core 200 provides video data to an external monitor connected to display port 114a through display control 214, display interface 224, display interface 124, and display control 114. The user can operate intelligent platform 10 and intelligent core 200, using an external keyboard or a mouse connected to data port 113a, which sends to control unit 201 the user's commands through data hub 113, data interface 123, data interface 223, and data control 213.

[2]ANSI/CEA-2017; A Common Interconnection for Portable Media Players standard, developed by the Consumer Electronics Association (CEA) in February 2010.

As discussed above, depending on the computational power of intelligent core 200, the combined intelligent platform 10 and intelligent core 200 can dynamically become any one of: a pad device, a tablet computer, or a laptop computer. In addition, intelligent platform 10 allows a user to upgrade its computational power, while retaining the services of existing peripherals on intelligent platform 10, by simply replacing the intelligent core by a different intelligent core. Alternatively, a user can rotate intelligent cores of different computational power to run high performance gaming applications or energy-saving applications (e.g., web browsing applications).

Figure 7A:
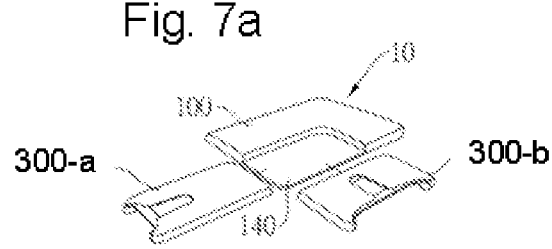
FIG. 7a is a perspective view of intelligent platform housing 100 compatible with either one of built-in core slot adaptors 300-a and 300-b, which are open at its top edge and its side edge, respectively.
Figure 7B:
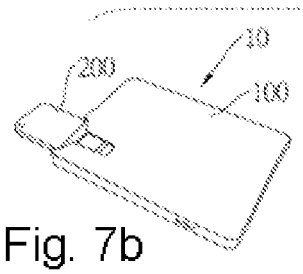
FIG. 7b is a perspective view of intelligent platform housing 100 accepting intelligent core 200 from its top edge.
Figure 7C:
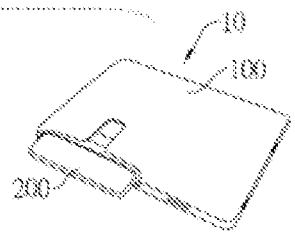
FIG. 7c is a perspective view of intelligent platform housing 100 accepting intelligent core 200 from its side edge.
Figure 7D:
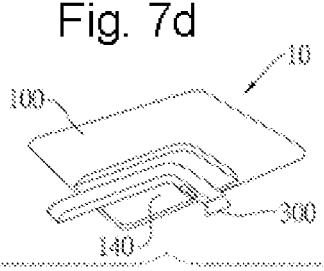
FIG. 7d is a perspective view of intelligent platform housing 100 with a changeable core slot adaptor 300.
Figure 7E:
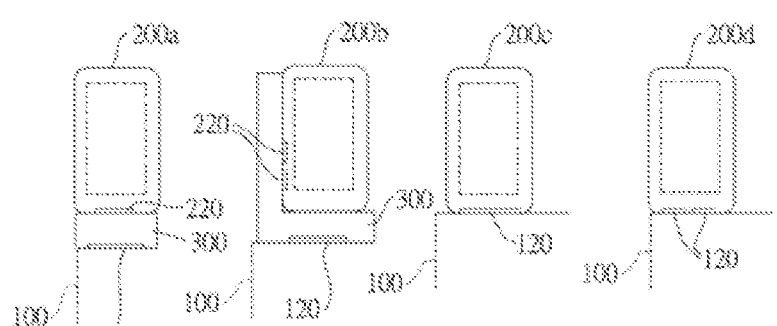
FIG. 7e is top view of intelligent platform housing 100 with different changeable core slot adaptors accommodating various intelligent cores.

FIGS. 7a to 7e further illustrate the use of core slot adopter 300 and universal core connector 120 to bridge between intelligent core 200 and intelligent platform 10, in the manner described above in conjunction with FIG. 5. Specifically, FIG. 7a is a perspective view of intelligent platform housing 100 compatible with either one of built-in core slot adaptors 300-a and 300-b, which are open at its top edge and its side edge, respectively. FIG. 7b is a perspective view of intelligent platform housing 100 accepting intelligent core 200 from its top edge. FIG. 7c is a perspective view of intelligent platform housing 100 accepting intelligent core 200 from its side edge. FIG. 7d is a perspective view of intelligent platform housing 100 with a changeable core slot adaptor 300. FIG. 7e is top view of intelligent platform housing 100 with different changeable core slot adaptors accommodating various intelligent cores.

One embodiment, shown in FIG. 7e as intelligent core 200a, has proprietary platform connector 220. In that embodiment, core slot adaptor 300 has one end connected to proprietary platform connector 220 of intelligent core 200a, and the other end connected to generic core connector 120. As shown in FIG. 5, core slot adaptor 300 includes a small circuit board with a protocol conversion circuit which translates different signal conventions between intelligent core 200a and intelligent platform 10. In another embodiment, shown in FIG. 7e as intelligent core 200b, has multiple proprietary platform connectors 220 (such as HDMI display and USB interfaces). Core slot adaptor 300 has one end connected to the proprietary platform connector 220 of intelligent core 200b, and the other end connected to generic core connector 120. As shown in FIG. 5, core slot adaptor 300 can include a small circuit board with a protocol conversion circuit which translates HDMI signal to Display Port signal if the core connector 120 is a PDMI connector. In yet another embodiment, shown in FIG. 7e as intelligent core 200c, intelligent core 200c and intelligent platform 10 use the matching male and female connectors 120 (e.g., the PDMI connectors of FIG. 6). In that case, core slot adaptor 300 is unnecessary. In yet another embodiment, shown in FIG. 7e as intelligent core 200d, both intelligent core 200d and intelligent platform 10 use the matched male and female connectors, but the component interfaces are not integrated (e.g., one and more of a DisplayPort connector, a HDMI connector, an USB connector, an audio connector, and a power connector are used). In that case also, core slot adaptor 300 is not required.

FIGS. 8a to 8i further illustrate various ways in which core slot 140 in intelligent platform housing 100 can be implemented to accommodate intelligent core 200 to achieve various configurations shown in FIG. 5.

Figure 8A:
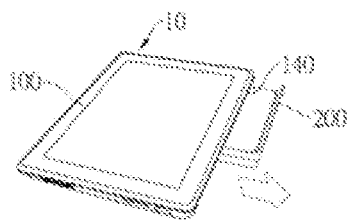
FIGS. 8a to 8i further illustrate various ways in which core slot 140 in intelligent platform housing 100 can be implemented to accommodate intelligent core 200 to achieve the configuration shown in FIG. 5; specifically.

FIG. 8a is a perspective view of intelligent platform housing 100 with a push-push drawer-type core slot 140. In one embodiment, core slot 140 is implemented as a push-push drawer, which can be pushed out in a manner similar to a DVD/CD tray on a notebook computer, so as to accept and to connect to intelligent core 200. A user can then push the drawer back to the closed position.

Figure 8B:
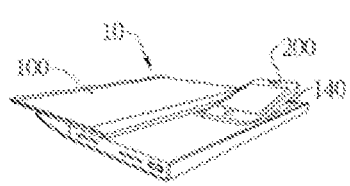

FIG. 8b is a perspective view of intelligent platform housing 100 with core slot 140 under a slide-able touch-sensitive display 110. In one embodiment, a user slides display 110 to expose the core slot 140, which allows intelligent core 200 to be placed into core slot 140 and to engage core connector 120 to establish the connection. Display 110 is then slid back into for closing.

Figure 8C:
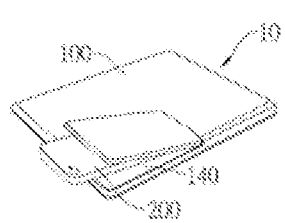

FIG. 8c is a perspective view of intelligent platform housing 100 with core slot 140 under a pop-up door, in the manner of a cassette tape door. In one embodiment, core slot 140 is provided under a pop-up door on intelligent platform housing 100. A user can push the door open, place the intelligent core 200 into core slot 140 and engage core connector 120 to establish a connection. The door can be pushed down again for closing.

Figure 8D:
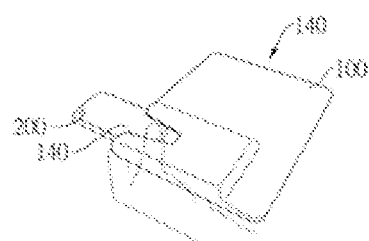

FIG. 8d is a perspective view of intelligent platform housing 100 with core slot 140 providing on an edge of intelligent platform housing 100. In one embodiment, core slot 140 is provided at an edge of intelligent platform housing 100. A user can insert intelligent core 200 into the core slot 140 until the male connector on the wall of core slot 140 is engaged with the female connector on intelligent core 200.

Figure 8E:
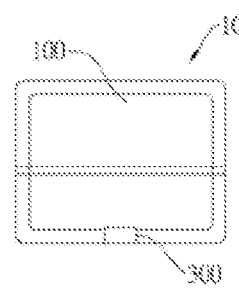
Figure 8F:
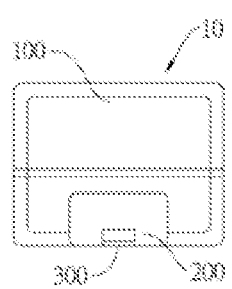
Figure 8G:
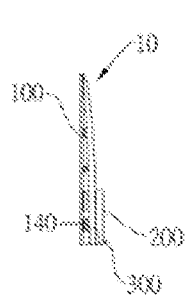

FIG. 8e is a rear view of small popped-out adaptor 300, which is implemented on the back of intelligent platform housing 100 to hold intelligent core 200, when popped-out. FIG. 8f is a rear view of intelligent platform housing 100 with small popped-out adaptor 300 holding an intelligent core 200, as illustrated in FIG. 8e. FIG. 8g is the right perspective view of FIG. 8f. The configurations shown in FIGS. 8e-8f are particularly space-saving designs of intelligent platform housing 100.

Figure 8H:
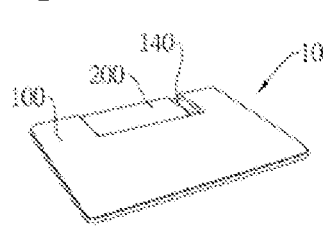

FIG. 8h is a rear view of intelligent platform housing 100 with open core slot 140 at one edge of intelligent platform housing 100. In one embodiment, a user can place intelligent core 200 onto core slot 140 and engage core connector 120 to establish the connection.

Figure 8I:
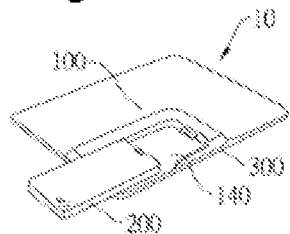

FIG. 8i is a rear view of intelligent platform 100 with open core slot 140 at one corner of intelligent platform housing 100. In one embodiment, a user can place intelligent core 200 onto core slot 140 and engage core connector 120 to establish the connection.

Figure 9:
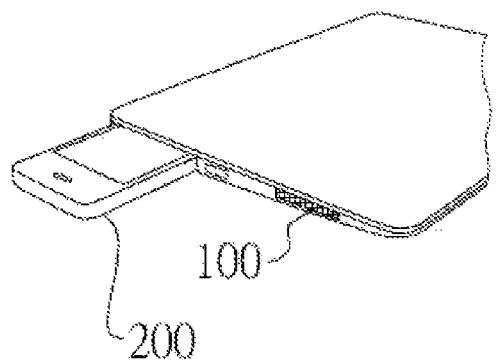
FIG. 9a is a partial perspective view of intelligent platform housing 100 with intelligent core 200 inserted, so as to result in a pad device.
FIG. 9b is a partial perspective view of intelligent platform housing with a handset size of low-end CPU box 200 inserted, so as result in a tablet computer.
FIG. 9c is a partial perspective view of intelligent platform housing 100 with a handset size of high-end CPU box 200 inserted, so as to result in a notebook computer.
FIG. 9d is a left perspective view of an existing netbook or notebook which supports a swappable intelligent core.
Figure 9:
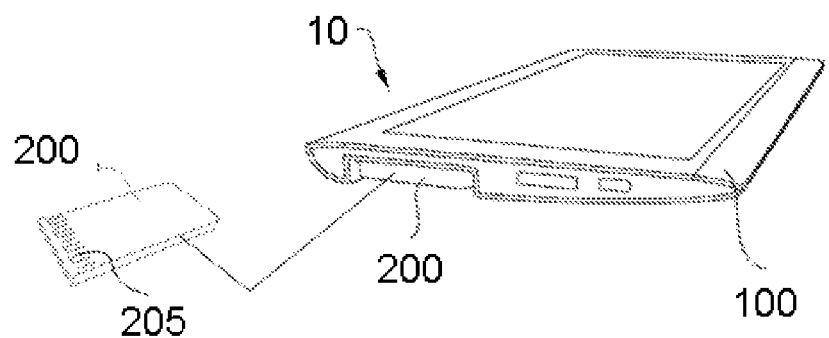

FIG. 9a is a partial perspective view of intelligent platform housing 100 with intelligent core 200 inserted, so as to result in a pad device. In one embodiment, intelligent core 200 is a "smart phone" type device with an ARM embedded microprocessor. When inserted, intelligent core 200 and intelligent platform 10 form a pad device. Intelligent core 200 becomes a "brain" device which drives the components of intelligent platform 10 to implement an Android-base pad device, for example, if intelligent core 200 has a Google Android Operating System. A user can disconnect the connection by pulling intelligent core 200.

FIG. 9b is a partial perspective view of intelligent platform housing with a handset size of low-end CPU box 200 inserted, so as result in a tablet computer. In one embodiment, intelligent core 200 may be a low-end CPU circuit board (e.g., an Intel Atom CPU) implemented into a box of a smart phone size, with a standard connector (e.g., PDMI described in FIG. 6). Depending on the operating system that is installed, intelligent core 200 can dynamically drive intelligent platform 10 to form a Windows tablet device, if the Windows OS is installed, or a Chrome Tablet, if the Google Chrome OS is installed. The embodiment provides user-flexibility in choosing different types of low-end CPUs from various vendors to create different tablet computers. In another embodiment, the low-end CPU box may be provided air holes 205 (FIG. 9b) on it to dissipate heat.

Figure 9C:
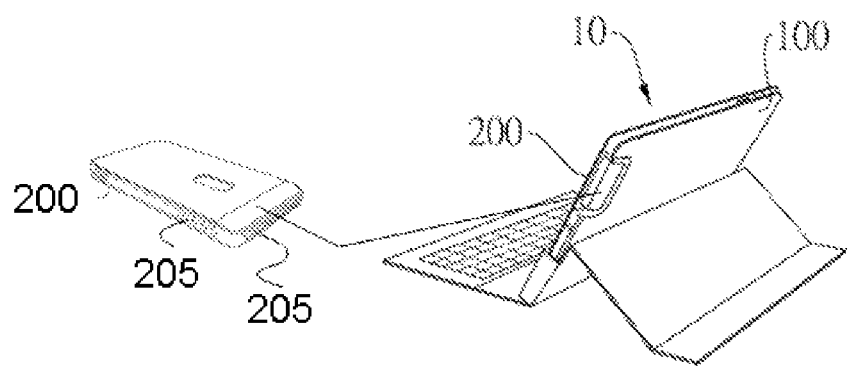

FIG. 9c is a partial perspective view of intelligent platform housing 100 with a handset size of high-end CPU box 200 inserted, so as to result in a notebook computer. In one embodiment, intelligent core 200 can be a high-end CPU circuit board (e/g/. an Intel "Sandy Bridge" CPU) implemented into a box of "smart phone" size with a standard connector, such as described above in conjunction with FIG. 9a. Together with an external keyboard and a standing case, intelligent platform 10 can dynamically become a high-end notebook. Depending on the type of operating system installed, intelligent core 200 can dynamically drive intelligent platform 10 to become a Windows notebook, if the Windows OS is installed. In another embodiment, to cool the high-end CPU, air holes 205 are provided to dissipate heat. Heat pipes and one or more heat sink may be connected to the CPU/GPU. In another embodiment, a CPU cooling fan may be installed in intelligent platform 10. The cooling fan blows cooled air into intelligent core 200 through one or more air ducts, such as described above in conjunction with FIG. 5. The system may have multiple Operating Systems (e.g., Android OS and Windows OS) installed, In that case, the user is prompted to pick which Operating System to boot up from upon power-up, thereby allowing a user the option of using a lightweight Operating System for system energy-savings.

Figure 9D:
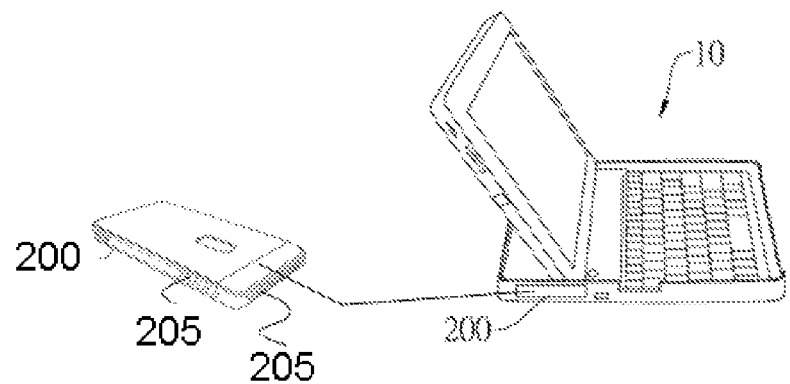

FIG. 9d is a left perspective view of an existing netbook or notebook 10 which supports a swappable intelligent core 200. In one embodiment, a netbook or notebook may be modified to support a swappable intelligent core on its chassis. Such a modification allows peripherals connected to the intelligent platform to be shared and reused by different CPU boxes. This is particularly useful to allow a user to upgrade a notebook computer to a higher performance CPU. A user can swap an existing CPU with a higher performance CPU, without having to pay the full price of a notebook computer. Such sharing not only avoids redundant components and simplifies manufacturing costs and processes, but is also environmentally friendly and allows a user to avoid having to pay monthly data fees (e.g., 3G data usage fees) for both the intelligent core 200 and the netbook or notebook 10.

Although the above described embodiments provide as examples each intelligent platform 10 as a body device, the present invention is in fact applicable any body device that is based on a core or a brain provided by another device. For example, rather than intelligent platform 10, the body device may be a digital television, a large graphical display monitor (e.g., LED, LCD, OLED, electronic ink, or plasma), or a projector with a slot for inserting an intelligent core. In the same manner, rather than an intelligent core as described above, the brain device may be, for example, any small mobile device, such as a portable media player, a digital personal assistant, or a small mobile computer.

Many modifications and variations within the scope of the present invention will be apparent to those skilled in the art based on the detailed description herein. Therefore, the present invention is not limited by the detailed description above, which is provided merely to illustrate the various exemplary embodiments.

Having thus described the invention, what is desired to be protected by Letters Patent is presented in the subsequently appended claims.

We claim:

1. A computing platform that accommodates a portable computing device, comprising:
a housing having a slot for receiving the portable computing device;
a plurality interfaces with the portable computing device, including (i) a power interface, and (ii) a data or video interface for communicate input data, output data, or video data to and from the portable computing device;
a plurality of peripheral control units including (i) a display control unit that controls a data port for connecting a display device, and (ii) a data control unit that controls a data port for connecting a data device;
an electrical connector provided for carrying signals sent from or received into the power interface and the data or video interface, wherein the electrical connector is provided on an inner wall of the slot and positioned for mechanically mating and electrically connecting to a matching electrical connector on the portable computing device; and
a platform control unit which coordinates the peripheral control units, such that, when the portable computing device is connected to the computing platform, (i) video data generated by a corresponding display control unit in the portable computing device is received at the data or video interface and provided to the display device through the data port controlled by the display control unit of the intelligent platform, (ii) input data received from the data device through the data port controlled by the data control unit of the intelligent platform is provided to a corresponding data control unit in the portable computing device over the data or video interface.

2. The computing platform of claim 1, wherein the display device is external to the computing platform.

3. The computing platform of claim 1, wherein the signals of the plurality of interfaces are carried in the electrical connector.

4. The computing platform of claim 1, further comprising a power supply circuit or a battery that provides power to the portable computing device through the power interface.

5. The computing platform of claim 1, wherein the portable computing device comprises one of: a cellular telephone, a digital personal assistant, a media or game player, and a circuit board with a central processing unit or graphical processing unit inside a swappable box of the size of a handset.

6. The computing platform of claim 5, wherein the circuit board further comprising on-board memories that support the central processing unit or graphical processing unit running application programs and playing digital videos.

7. The computing platform of claim 1, further comprising an external connector provided for carrying signals of at least one of: the data port and the video port.

8. The computing platform of claim 1, further comprising a data hub module, and one or more peripheral modules selected from the group consisting of: a memory module, an image or video capture module, a wire or wireless networking module, a headphone, a microphone, and a speaker.

9. The computing platform of claim 1, wherein the intelligent platform and the portable computing device form an integrated computing device that functions as a pad device, a tablet computing device, a netbook computer, or a notebook computer.

10. The computing platform of claim 9, wherein the operations of the integrated computing device are controlled from the portable computing device's central processing unit architecture and loaded operating system.

11. The computing platform of claim 1, further comprising a mass storage device, such that the computing platform operates as a portable standalone external data storage device when the portable computing device is not connected.

12. The computing platform of claim 1, wherein the display device is selected from the group consisting of: liquid crystal (LCD) displays, electronic ink displays (ePaper), organic light emitting diode (OLED), and micro projector displays.

13. The computing platform of claim 1, wherein the portable computing device has a display smaller than a display provided on or connected to the computing platform.

14. The computing platform of claim 1, wherein the portable computing device does not have a display.

15. The computing platform of claim 1, wherein the electrical connector comprises a pin-compatible connector that interconnects with a connector on the portable computing device.

16. The computing platform of claim 1, further comprising an adaptor, the adaptor having, at one end, a pin-compatible connector that interconnects with the electrical connector of the computing platform and at another end, a pin-compatible connector for interconnecting with the portable computing device, the adaptor including a built-in integrated circuit for translating between a signaling convention of the computing platform and a signaling convention of the portable computing device.

17. The computing platform of claim 1, the computing platform operates as a portable monitor, or a digital image player, when the portable computing device is not connected.

18. The computing platform of claim 1, wherein the data or video interface comprises an industry standard interface, selected from the group consisting of a Universal Serial Bus, PDMI, HDMI, and DisplayPort.

19. The computing platform of claim 1, wherein the display device is integrated with the computing platform.

* * * * *